3,380,807
PREPARATION OF HYDROXYLAMINE AND MON-
OCARBOXYLIC ACIDS FROM PRIMARY NITRO-
PARAFFINS AND OXALIC ACID
Lawrence R. Jones, Terre Haute, Ind., assignor to Com-
mercial Solvents Corporation, New York, N.Y., a cor-
poration of Maryland
No Drawing. Filed July 6, 1965, Ser. No. 469,926
9 Claims. (Cl. 23—190)

ABSTRACT OF THE DISCLOSURE

A process for preparing hydroxylamine and moncar-
boxylic acids by reacting a primary nitroparaffin, for ex-
ample 1-nitropropane, with oxalic acid.

---

This invention relates to a process for the production of hydroxylamine and monocarboxylic acid. In a particular aspect this invention relates to a process for the production of hydroxylamine and monocarboxylic acid by reacting a primary nitroparaffin with oxalic acid.

In U.S. Patent 2,381,410, issued Aug. 7, 1945, it is disclosed that hydroxylamine and monocarboxylic acid are obtained by heating a primary nitroparaffin and hydrochloric acid in the presence of a monocarboxylic acid. Acetic acid, propionic acid and butyric acid are specifically mentioned for use in the process. It is stated in the patent that the monocarboxylic acid of use in the process served principally as a solvent for the primary nitroparaffin and the hydrochloric acid.

In the prior art process the hydroxylamine is obtained as the crystalline salt of hydrochloric acid (hydroxylamine hydrochloride). When other forms of hydroxylamine are desired it is necessary to dissolve the crystalline salt in a suitable solvent such as water or methanol and then convert the hydroxylamine to the desired form.

It is an object of the present invention to provide a process for the production of hydroxylamine and monocarboxylic acid.

A further object of the present invention is the provision of a process for the production of hydroxylamine and monocarboxylic acid without the employment of hydrochloric acid in the reaction step.

Further objects and advantages of the present invention will be apparent from the specification and the appended claims.

It has been discovered in accordance with the present invention that monocarboxylic acid and hydroxylamine are obtained by reacting a primary nitroparaffin with oxalic acid without the employment of hydrochloric acid in the reaction step. Acetic acid, propionic acid and butyric acid are not successfully employed as the organic acid of use in the present invention. The reaction results in the conversion of the primary nitroparaffin to the corresponding monocarboxylic acid and to hydroxylamine. For example, propionic acid and hydroxylamine result from the reaction of 1-nitropropane and oxalic acid. The reaction is illustrated as follows:

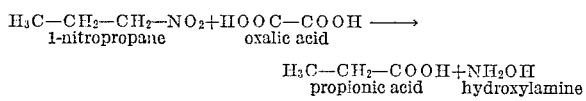

The nitroparaffins of use in the present invention are primary nitroparaffins that is to say nitroparaffins wherein the nitro group is bonded to a carbon atom which is in turn bonded to at least two hydrogen atoms. Typically suitable primary nitroparaffins are represented by the formula R—NO$_2$ wherein R is an alkyl radical having from one up to about seven carbon atoms. Representative primary nitroparaffins include nitromethane, 1-nitrohexane, nitroethane, 1-nitropropane, 1-nitropentane, 1-nitrobutane, 1-nitroheptane, etc., and the like. Monocarboxylic acids prepared from such typical primary nitroparaffins are represented by the formula

wherein R' is an alkyl radical having from one up to about six carbon atoms. Representative monocarboxylic acids prepared in accordance with the present invention include formic acid, acetic acid, butyric acid, propionic acid, etc., and the like.

In accordance with the present invention a primary nitroparaffin and oxalic acid are reacted to obtain hydroxylamine and monocarboxylic acid. The process of the invention is suitably carried out by heating the primary nitroparaffin and the oxalic acid under reflux conditions, preferably in the presence of an inert solvent, that is to say a solvent inert to the reactants and the reaction products. Examples of such solvents are water, methanol, ethanol, propanol, butanol, etc., and the like. The use of methanol is preferred. A weight ratio of solvent to reactants of in excess of 2:1, for example from about 5:1 to about 20:1, is typically employed.

The temperatures employed in the present invention may vary and will depend among other things on the particular nitroparaffin employed and on the particular inert solvent employed. For example, when the reaction is carried out under reflux conditions with methanol as the solvent and 1-nitropropane as the nitroparaffin, temperatures in the range of about 60 to about 70° C. are typically employed at atmospheric pressure. When butanol is substituted for methanol as the solvent of the process, temperatures in the range of about 115 to about 125° C. are typically employed at atmospheric pressure.

The mole ratio of oxalic acid to primary nitroparaffin is of importance in the present invention. While hydroxylamine and monocarboxylic acid are obtained at lower ratios, best results are obtained when the mole ratio of oxalic acid to primary nitroparaffin is in excess of 1:1, for example in the range of about 2:1 to about 5:1.

The hydroxylamine and monocarboxylic acid produced according to the process of the present invention may be recovered from the reaction medium by any suitable procedure. For example, the hydroxylamine may be recovered as free hydroxylamine by neutralization of the reaction medium with a suitable base followed by distillation of the neutralized reaction medium under reduced pressure to remove the free hydroxylamine. The hydroxylamine may also be precipitated from the reaction medium as the salt of oxalic acid by cooling and concentrating the reaction medium. The hydroxylamine may also be recovered as the salt of a strong mineral acid such as sulfuric acid or hydrochloric acid by methods known to the art.

The invention will be understood more fully by reference to the specific examples. It is understood that the examples are presented for purposes of illustration only and are not intended as a limitation of the invention.

Example 1

To 200 ml. of methanol were added 30 grams of 1-nitropropane and 60 grams of oxalic acid. The resulting mixture was stirred to form a solution. The solution was then refluxed at atmospheric pressure at a temperature ranging from about 60 to 70° C. for 20 hours. Hydroxylamine and propionic acid were obtained.

Example 2

The procedure of Example 1 was repeated with the exception that at the end of the 20-hour period aqueous hydrochloric acid was added to the reaction medium. The reaction medium was then distilled to remove propionic acid. The distilled reaction medium was then evaporated to dryness under vacuum. Hydroxylamine hydrochloride was obtained.

Example 3

The procedure of Example 1 is repeated in all essential details with the exception that 1-nitroethane is substituted for 1-nitropropane and butanol is substituted for methanol. Acetic acid and hydroxylamine are obtained.

Example 4

The procedure of Example 1 is repeated in all essential details with the exception that nitromethane is substituted for 1-nitropropane. Formic acid and hydroxylamine are obtained.

Example 5

The procedure of Example 1 is repeated in all essential details with the exception that 1-nitrobutane is substituted for 1-nitropropane. Butyric acid and hydroxylamine are obtained.

Since many embodiments of this invention may be made and since many changes may be made in the embodiments described, the foregoing is interpreted as illustrative only and the invention is defined by the appended claims.

I claim.

1. A process for the production of hydroxylamine and monocarboxylic acid which comprises reacting a primary nitroparaffin with oxalic acid to form hydroxylamine and monocarboxylic acid and separating the hydroxylamine from the monocarboxylic acid.

2. The process of claim 1 wherein the reaction is conducted in the presence of an inert solvent.

3. A process for the production of hydroxylamine and monocarboxylic acid which comprises heating a primary nitroparaffin of the formula $R-NO_2$ wherein R is an alkyl radical containing from 1 up to about 7 carbon atoms with oxalic acid in the presence of an inert solvent to form hydroxylamine and monocarboxylic acid and separating the hydroxylamine from the monocarboxylic acid.

4. The process of claim 3 wherein the heating is carried out under reflux conditions.

5. The process of claim 4 wherein the mole ratio of oxalic acid to primary nitroparaffin ranges from about 1:1 to about 5:1.

6. The process of claim 4 wherein the solvent is methanol and the weight ratio of solvent to the total of primary nitroparaffin and oxalic acid is in the range of from about 5:1 to about 20:1.

7. The process of claim 6 wherein the reflux temperature is in the range of from about 60 to about 70° C.

8. The process of claim 4 wherein the solvent is butanol and the weight ratio of solvent to the total of primary nitroparaffin and oxalic acid is in the range of from about 5:1 to about 20:1.

9. The process of claim 8 wherein the reflux temperature ranges from about 115 to about 125° C.

References Cited

UNITED STATES PATENTS

| | | | |
|---|---|---|---|
| 2,113,813 | 4/1938 | Lippincott | 23—190 |
| 2,381,410 | 8/1945 | Tryon | 23—190 |

OSCAR R. VERTIZ, *Primary Examiner.*

MILTON WEISSMAN, *Examiner.*

H. S. MILLER, *Assistant Examiner.*